United States Patent Office 3,065,672
Patented Nov. 27, 1962

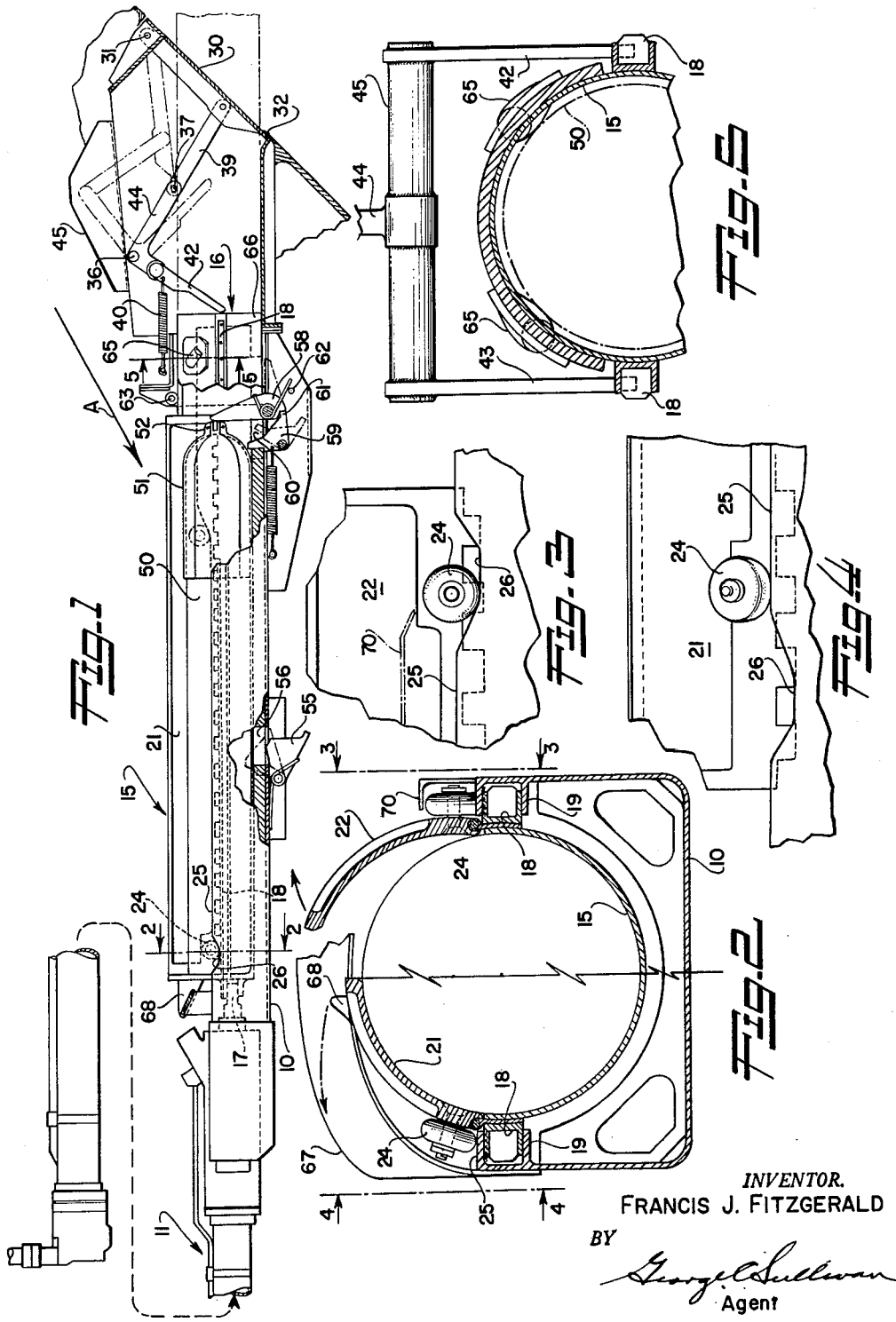

3,065,672
RETRO EJECTOR GUN
Francis J. Fitzgerald, Burbank, Calif., assignor to Lockheed Aircraft Corporation, Burbank, Calif.
Filed July 25, 1960, Ser. No. 45,200
1 Claim. (Cl. 89—1.5)

This invention pertains to a device to eject objects from a moving vehicle at a velocity equal to its forward speed but in opposite direction.

In dropping objects from aircraft, it is desirable to pinpoint as closely as possible the location at which the object will fall on the surface of the earth. An object dropped from an aircraft will have a trajectory which is influenced by its speed as it leaves the aircraft, its own aerodynamic characteristics and wind drift. In many instances, it is desirable to be able to drop an object on a spot directly under the aircraft at the moment of its ejection. Parachute devices which tend to stop the object in air immediately upon its departure from the aircraft have been found useful but do not entirely eliminate the forward movement of the object between the time of ejection and the opening of the parachute device.

In order to entirely eliminate this forward movement, it would be necessary to stop the aircraft dead in the air prior to dropping the object. Since this is obviously impossible, the better solution is to eject the object at a speed equal to the aircraft speed but in a direction opposite to the direction of movement of the aircraft so that the object has no movement with respect to the surface of the earth at the moment of departure.

Modern aircraft are pressurized to permit flight at altitudes dangerous to man. This means that the interior of the aircraft must be pressurized and sealed from the low pressure atmosphere. Any object which is to be dropped from this type of aircraft must be carried exteriorly of the pressurized cabin or some means must be provided to pass the object from the cabin to the exterior with minimum loss of pressure. The first alternative would require remote controls and exterior storage means in order to provide for variable drop situations, each requiring a different object to be ejected depending on the circumstances of the moment. By providing access to the gun from the interior of the aircraft, the crew is permitted to vary the store or object at will. The present invention makes possible the latter alternative.

It is the object of the present invention to provide a device which will cause an object to be ejected from a vehicle at approximately zero speed relative to the surface of the earth. An aft firing gun is provided for this purpose.

It is another object of this invention to provide a retroejection device which will minimize damage to the object during ejection. The object to be ejected is set and retained against the closed end of an open-ended reciprocating barrel during the firing cycle to eliminate relative motion between the moving barrel and the object which might result in its damage.

It is another object of the present invention to provide a retro ejector adapted for use in pressurized aircraft. Doors are provided on an open-ended reciprocating barrel through which the store may be loaded and which are closed prior to the ejection cycle so as to seal the interior of the aircraft from the exterior when the barrel is extended into the airstream. The barrel cooperates with a door on the exterior skin of the aircraft to open it inwardly out of the path of the reciprocating barrel. Thus, should the exterior door closing linkages fail, the pressure differential between the inside and the outside of the craft will cause the exterior door to close.

It is another object of the present invention to pro-
vide a retro ejector which will cause a prerotation of the ejected object prior to its entry into the airstream. Where the object has rotavanes to slow its descent, prerotation is advantageous. Canted rollers mounted in the barrel contact the object as it departs therefrom to rotate it about its longitudinal axis.

Other objects and advantages of the present invention will become apparent from the reading of the following specification as taken in conjunction with the appended drawings wherein like numerals indicate like elements.

FIGURE 1 is a side view of the retro ejector gun.
FIGURE 2 is a cross sectional view taken on lines 2—2 of FIGURE 1.
FIGURE 3 is a side view of figure taken on lines 3—3 of FIGURE 2.
FIGURE 4 is a side view taken on lines 4—4 of FIGURE 2.
FIGURE 5 is a cross sectional view with parts broken away taken on lines 5—5 of FIGURE 1.

The assembly shown in FIGURE 1 is mounted inside an aircraft or other moving vehicle at an angle with respect to the horizontal axis of the vehicle so that it is slanted downwardly and aft with respect to the direction of movement of the vehicle. The horizontal axis and direction of movement of the vehicle is shown by arrow "A." A housing 10 provides means in which cylindrical barrel 15 having an open end 16 reciprocates from the full line forward position to the dashed line aft position and back. Toward the end of the aft stroke of barrel 15, it will be moving at a velocity approximately equal to that of vehicle in an opposite direction. When the barrel 15 reaches the aft end of its stroke, the momentum imparted to the object or store therein will carry the object through its open end at substantially zero speed with respect to the surface of the earth.

Barrel 15 is driven by pneumatic or hydraulic pressure in piston-cylinder combination 11 fixed to the upper forward end of housing 10. Link 17 connects the piston rod to the forward end of barrel 15. As can be more clearly seen in FIGURE 2, rails 18 extending the length of barrel 15 are fixed to the lateral external surfaces of barrel 15 and slide in guides 19 fixed to the inner surfaces of housing 10. Appropriate valving for piston-cylinder combination 11 will cause the barrel 15 to return from its extended or aft firing position to its forward loading position in preparation for another shot.

The barrel 15 is equipped with clam shell doors 21 and 22 which are open for loading but closed prior to firing to minimize pressure escape. Each of doors 21 and 22 carries a wheel 24 fixed to its forward end which rides on surface 25. When barrel 15 is in its forward position as in FIGURE 1, the wheels 24 will fall into the cammed area 26 of surface 25 to open the door as shown in FIGURE 3. It is obvious that both doors will open and close together. FIGURE 2 is shown with door 21 closed and door 22 partly open in a split view for simplicity of explanation. When the barrel 15 moves toward the right as seen in FIGURE 1, each wheel 24 will ride up on the surface 25 to force the doors 21 and 22 to close together so that little of the pressurized air can escape through the clam shell doors 21 and 22 and the open end 16 of barrel 15 when it is extended into the airstream.

There remains the problem of leakage of pressurized air through the opening in the external skin of the aircraft through which barrel 15 is extended during the firing cycle. External door 30 is pivoted at hinge 31 while its lower edge rests against lip 32 so that it can only swing inwardly. Thus, should any part of the linkage biased by spring 40 fail, the internal pressure of the aircraft would tend to close door 30 to prevent escape of pressure air. Rails 18 on moving barrel 15 contact appropriate linkage shown in FIGURE 1 to open door 30. Arms 42 and 43 in contact with rails 18 are fixed to arm 44 through shaft 45 to form a bell crank pivoted at 36. The lower end of arm 44 is pivoted to link 39 which in turn is pivoted to door 30 to pull it inwardly by movement of the barrel 15. Spring 40 will return door 30 to its closed position against lip 32 upon return of barrel 15 to its forward position as shown in FIGURE 1. The linkage to open door 30 can be encased in the housing 45 to further prevent leakage of pressurized air in case of failure of the door mechanism 30.

The store is shown as a sonobuoy 50 with rotavanes 51 hinged at its top 52. Doors 21 and 22 will be opened when wheels 24 fall into cammed areas 26 when in the upper position as shown in FIGURE 1 so that sonobuoy 50 may be placed therein. The weight of sonobuoy 50 will cause the sear 55 to be biased out of slot 56 in the bottom of the barrel 15. The weight of sonobuoy 50 and the barrel 15 will cause it to slide forward slightly until buoy top 52 rests against the retaining sear 58 and the barrel against barrel sear 59 which extends into slot 60 in barrel 15. In this position the buoy 50 is in the barrel 15, the doors 21 and 22 are closed, sear 55 is pressed out of slot 56, barrel 15 is resting against barrel sear 59, rail 18 rests against arms 42 and 43, and the gun is ready for firing.

Firing is initiated by a signal to a solenoid or other valve means not shown to permit flow of high pressure fluid to piston-cylinder combination 11. Barrel 15 will move aft causing barrel sear 59 to be rotated clockwise thereby removing the stop 61 on its forward edge from notch 62 on the lower edge of the retaining sear 58 permitting it to be rotated clockwise by the aft movement of the sonobuoy 50 in barrel 15. Small roller 63 will hold the doors 21 and 22 of barrel 15 closed throughout the firing stroke.

Rotavanes 51 will open immediately in the airstream. The lower vane will contact the airstream first and open before the others. This will cause sonobuoy to tend to pitch. Therefore, prerotation means are desirable. Rollers 65, of which there are four, are provided in the barrel extension 66 to cause rotation of the rotavanes 51 as the sonobuoy passes through.

When barrel 15 reaches its lower or rearward extremity of movement, the fluid flow into piston-cylinder combination 11 will be reversed to return barrel 15 to its forward position. Spring 40 will pull door 30 to its closed position against the lip 32 when the rails 18 have cleared arms 42 and 43. In the forwardmost position of retraction, sear 55 will be biased into the slot 56 in the lower side of barrel 15 to retain it in its upper forward position for the loading operation. Wheels 24 will be forced into the cammed areas 26 by tab 68 as shown on door 21 riding on the U-shaped camming member 67 or by the cam surface 70 above wheels 4 as shown on door 22 causing doors 21 and 22 to open. The cam surface 67 cooperating with tab 68 and the cam 70 are alternate means. One or the other is used. Both are shown here for example only.

The scope of the invention does not restrict its use as shown or described. For instance, it may be affixed to any vehicle whether it be one which travels through space, on the surface of the earth, or underwater. It may be used in a stationary position. It may fire forward or sideways as well as aft. It may fire an object of any character, size or shape.

Having described my invention in detail, I claim the following combination and their equivalents to which I wish the protection of a United States Letters Patent:

A retro ejector gun comprised of a housing, a barrel reciprocable in the housing, the barrel having a closed end and an open end through which a store may be ejected, means to reciprocate the barrel in the housing, a door hinged to the housing and spaced from the open end of the barrel and substantially normal thereto, hinge means for the door, link means operable by reciprocation of the barrel to open the door inwardly, clam shell door means on the barrel through which a store may be loaded into the barrel, means responsive to the loading of the store into the barrel to cause the clam shell door means to close, means to retain the store in the closed end of the barrel, means responsive to reciprocation of the barrel to displace the retaining means to allow the store to be ejected through the open end of the barrel.

References Cited in the file of this patent
UNITED STATES PATENTS

| | | |
|---|---|---|
| 1,621,654 | Boos | Mar. 22, 1927 |
| 2,438,924 | Kramer et al. | Apr. 6, 1948 |
| 2,590,897 | Simpson | Apr. 1, 1952 |
| 2,800,835 | Mayer | July 30, 1957 |
| 2,913,198 | Bonbrake | Nov. 17, 1959 |
| 2,937,573 | Gantschnigg | May 24, 1960 |